Sept. 30, 1941.　　C. L. BRACKETT ET AL　　2,257,589
SCREW THREADED ELEMENT
Filed Feb. 24, 1939

Inventor
CLARE L. BRACKETT
CHARLES E. S. PLACE
By E. F. Salter
Attorney

Patented Sept. 30, 1941

2,257,589

UNITED STATES PATENT OFFICE 2,257,589

SCREW THREADED ELEMENT

Clare L. Brackett and Charles E. S. Place, Detroit, Mich.; said Place assignor to said Brackett Application February 24, 1939, Serial No. 258,312

4 Claims. (Cl. 151—14)

This invention relates to screw threaded elements and the present application is a continuation in part of our prior copending application Serial No. 189,272, filed Feb. 7, 1938, for Thread surface coating.

An object of the present invention is to provide a screw threaded element that is inherently resistant to loosening when service engaged with a complemental element.

Another object is to provide, as an article of manufacture, a screw threaded element having a thread surface coating of a material having the capacity to yield under pressure in any or all directions.

Still another object is to provide a thread coated screw threaded element wherein the thread coating is formed of an elastic film of rubber or equivalent material, non-adherent with respect to the body of the element, and capable of displacement thereon in conformity with and for the purpose of providing a compressed expansible filling for thread clearances incident to the engagement of the coated element with a complemental threaded element.

A further object is to provide an elastic surface on screw threaded elements whereby to create an elastic bond between the threaded contacting surfaces of engaged elements which is capable of absorbing service vibrations that would otherwise tend to loosen their engagement.

Other objects will be apparent to those skilled in the art.

In the practice of our invention a screw threaded element, for example a nut, screw, bolt or the like, has deposited directly on the metal thread surfaces thereof a continuous and very thin film of rubber, preferably vulcanized although not necessarily so, and most conveniently obtained by the use of latex compound which is cured directly on the metal body, preferably by the inclusion of ultra accelerators, with or without the application of heat.

The rubber film deposit may also be obtained through the application of a water dispersion of rubber or solvent solutions of rubber, such as naphtha, toluol, carbon tetrachloride, etc., with or without a cure, and from which the water or solvent is evaporated to leave a dry rubber film completely covering the thread surfaces.

The deposited film is a very thin and continuous coating which is distinctly non-adherent to the metal surface to which it is applied. It is soft and elastic, being capable of yielding in any or all directions under mechanical pressure.

Although a coating of raw unvulcanized rubber suffices for the purposes of the invention, it is preferred that the rubber be cured in order to improve its tensile strength and to enable it to withstand the action of light and temperatures.

As is well known to those skilled in the art, the threads of complemental screw threaded elements, such as nuts and bolts, for example, are produced with a given tolerance, dependent upon which is the amount of existing clearance both during the process of engagement and at the point of final engagement. The rubber film of the present invention, being very thin, undergoes little or no change in form during the process of engagement of the elements except, perhaps to yield or stretch somewhat when two high spots on the complementary threads become axially aligned. However, at the point of final engagement only the bottom two or three threads of the nut engage upon the corresponding threads of the bolt, and it is between these contacting surfaces that the tightening load is carried.

Figure 1:
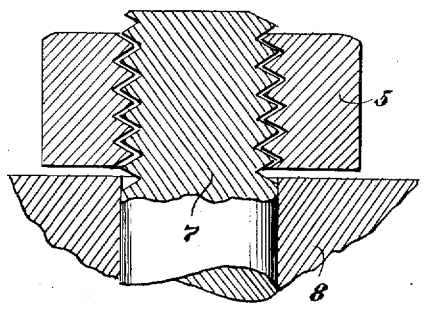
Figure 1 illustrates a conventional assembly of nut and bolt in which the nut is in process of being threaded home on the bolt stem.

The utility and application of the invention are made clear from the illustrated embodiment of the invention, in which a nut 5 having its thread surfaces entirely coated with a rubber film 6 deposited thereon in accordance with the invention is engaged over a threaded bolt stem 7. The existing clearances which are substantially constant during the process of threading the nut on the bolt stem up to the point of final engagement are best shown, on a greatly enlarged scale, in Figure 1, where a conventional uncoated nut has not yet begun to bear against the member 8 which is to be secured by the assembly.

Figure 2:
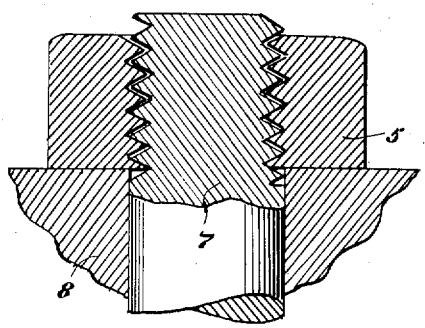
Figure 2 illustrates the assembly at the point of final engagement of the nut.

Figure 2 illustrates that when the nut is tightened home upon the bolt at the point of final engagement only the bottom two or three threads of the nut engage upon the corresponding threads of the bolt, and it is between these engaged threads that the tightening load is carried.

Figure 3:
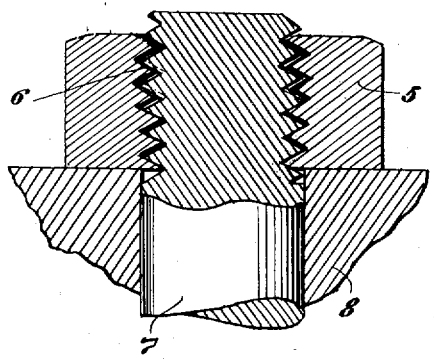
Figure 3 is a view similar to Figure 2 and illustrating an assembly in which the nut threads are coated in accordance with the invention.
Figure 4:
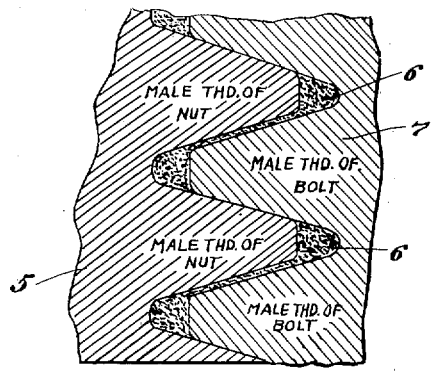
Figure 4 is a greatly enlarged fragmentary axial section through the lower three threads of the nut as finally engaged upon the bolt in the position of Figure 3.

Figures 3 and 4 illustrate the action which takes place when the nut 5 is coated with a rubber film 6 and engaged over the bolt. The original clearances between the upper threads remain as the coating 6 is too thin to have any appreciable effect until the nut comes to its point of final engagement. As this point is reached the mechanical pressure exerted over the faces of the nut threads at their areas of actual bearing contact against the corresponding bolt threads causes a fracture of the coating film. Since the film does not adhere to the metal of the threads the body of the film is correspondingly shifted and crowded under compression into the clearances which exist between the inclined under faces of the nut threads and the corresponding inclined top faces of the bolt threads, as best shown in Figure 4, and also into the radial clearances which exist between the blunt nose of the male threads and the bottom of the female thread grooves, completely filling all existing clearance spaces and surface irregularities with a compressed elastic packing which tends constantly to expand and which thereby grips the male threads with a firm elastic resistance to retrograde movement.

The elasticity of the mass of displaced film which is crowded under compression into the clearance spaces as described provides a definite cushioning effect which absorbs shocks and vibrations that would otherwise be transmitted directly to the engaged elements, and thus functions additionally to prevent disengagement of the elements.

It is an important feature of the invention that no pretreatment of the metal thread surfaces is necessary to accomplish the coating, and no metallurgical alteration is required. The deposited rubber does not adhere to the metal although it binds thereon by virtue of frictional engagement and to that extent is resistant to movement with respect to the surface to which it is applied.

We claim:

1. As an article of manufacture, a screw threaded fastening element having its thread surface coated with a film of non-adherent rubber thin enough not to interfere with normal threading engagement with a complemental threaded element.

2. As an article of manufacture, a screw threaded fastening element having on its thread surface an applied deposit of non-adherent rubber in the form of a continuous elastic film thin enough not to interfere with normal threading engagement with a complemental threaded element.

3. As an article of manufacture, a screw threaded fastening element having a continuous non-adherent thread surface covering of rubber formed thereon as a film thin enough not to interfere with normal threading engagement with a complemental threaded element.

4. As an article of manufacture, a screw threaded metal element having on its thread surface a coating consisting of a thin film of latex applied directly on the metal itself without prior treatment or metallurgical alteration thereof.

CLARE L. BRACKETT.
CHARLES E. S. PLACE.